United States Patent

[11] 3,573,875

| [72] | Inventor | John F. Zuczek |
| | | Oakdale Village, N.J. |
| [21] | Appl. No. | 760,506 |
| [22] | Filed | Sept. 18, 1968 |
| | | Division of Ser. No. 567,955, July 26, 1966, Pat. No. 3,421,164. |
| [45] | Patented | Apr. 6, 1971 |
| [73] | Assignees | Herbert Grodnick |
| | | Metuchen, |
| | | Martin Grodnick |
| | | Maplewood, N.J., fractional part interest to each |

[54] SEAL FOR THE END FACES OF PARALLEL ROLLERS
4 Claims, 13 Drawing Figs.

[52] U.S. Cl. ..................................... 277/227, 277/237
[51] Int. Cl. ..................................... F16j 15/54
[50] Field of Search ........................... 277/90, 237, 237 (R), 227, 81, 82; 34/242; 68/22, 22 (B), 43, 99; 118/404, 405, 419

[56] References Cited
UNITED STATES PATENTS

| 1,946,627 | 2/1934 | Karrer | 68/22(B) |
| 3,269,303 | 8/1966 | Qviller | 68/22(B) |
| 2,352,784 | 7/1944 | Geyer | 277/90 |
| 2,362,363 | 11/1944 | Doede | 277/90X |
| 2,844,889 | 7/1958 | Corbett | 34/242 |
| 3,071,866 | 1/1963 | Mangus | 34/242X |
| 3,291,468 | 12/1966 | Albertsen et al. | 34/242X |
| 3,367,667 | 2/1968 | Allen | 277/237RUX |

Primary Examiner—Laverne D. Geiger
Assistant Examiner—Robert I. Smith
Attorney—Samuelson and Jacob

ABSTRACT: A seal for use in an apparatus in which a container is established by a plurality of rollers cooperating with one another to establish an axially extending cavity and a relatively rigid plate member urged toward the corresponding ends of the rollers, the seal including a flexible bearing member of low friction material providing a sealing surface at the corresponding ends of the rollers and a resilient backing member contiguous with the bearing member and lying between the bearing member and the rigid plate for maintaining the sealing surface in sealing engagement at the ends of the rollers.

INVENTOR.
JOHN F. ZUCZEK
BY
Samuelson & Jacob
ATTORNEY

SEAL FOR THE END FACES OF PARALLEL ROLLERS

This application is a division of an earlier application Serial No. 567,955, filed Jul. 26, 1966 now U.S. Pat. No. 3,421,164.

The present invention relates generally to a seal for use in apparatus in which a container is established by a plurality of rollers cooperating with one another to establish an axially extending cavity and a relatively rigid plate member urged toward the corresponding ends of the rollers, and pertains, more specifically, to a seal for use in apparatus for padding bleach, dyestuffs or other chemical solutions into absorbent textile materials in continuous length and in open width.

The term "padding" will be used hereinafter to refer to dyeing, bleaching, impregnating or like treatment with a treating liquor. The term "materials" is intended to embrace various materials employed in the textile industry, for example, cotton, wool, rayon, nylon, and other natural or synthetic materials, and fabrics, sheets, webs or yarns made from glass or plastic materials, and includes tubular knit fabric, flat knit fabric, woven fabric and nonwoven fabric. The invention pertains, more specifically, to the padding of materials in tubular knit form; however, the principles of the invention and the techniques disclosed herein are applicable to the padding of materials in other forms.

Simple padding of a chemical solution into an absorbent material is usually accomplished by immersing the material in a bath of treating liquor, allowing the material to absorb as much of the liquor as possible, and then removing any excess liquor. In such a process the solution tends to remain on the surface of the material after immersion. However, in these processes the removal of excess liquor is generally carried out by passing the material through the nip of a pair of rollers thereby not only squeezing out the excess liquor but driving a small portion of the solution further into the material. As a result, it becomes extremely difficult in such a process to control the uniformity of application and the amount of liquor retained in the material and thus assure that the desired amount of solution remains in the material. In most instances it is desirable to obtain a high degree of penetration of the material by the treating liquor as well as maintain a close control over the amount of liquor retained in the material at the completion of the padding operation. This is particularly true in instances where the treating liquor is a dye solution which must react with the fibers of the material to impart color to the material and where more complete penetration will result in a more uniform color while control of the amount of the solution remaining in the material will further serve to reduce excessive consumption of treating liquor. Increased penetration of material by a dye solution is particularly important in the dyeing of tubular knit goods in open width since it is important to maintain uniformity of color in both layers of the flattened tubular material as well as along the folds at the outer edges of the elongated material. Reliance upon the pressure exerted by the nip of a pair of rollers to achieve such penetration has not produced completely satisfactory results. Efforts to increase penetration by increasing the pressure at the nip of the rollers have not provided significantly better results.

It is an object of the invention to provide a seal for use in apparatus for accomplishing increased penetration of an absorbent material by a treating liquor and increased control over the amount of treating liquor retained in such material.

Another object of the invention is to provide a seal in apparatus for padding absorbent material, and particularly for dyeing tubular knit goods in continuous length and in open width, wherein there is accomplished a uniformity and close control in the amount of padded solution retained in the material at the completion of the padding operation.

A still further object of the invention is to provide a seal at the ends of cooperating rollers to seal the cavity established between the rollers to form a closed container.

Still another object of the invention is to provide a seal of the type described above and wherein the seal is lubricated by the fluid in the container and the ends of the rollers are cooled by the fluid in the container.

The above objects as well as further objects and advantages are realized in the seal of the invention which may be described briefly as a seal for placement at the corresponding ends of cooperating rollers, the ends ordinarily lying in a common plane, the seal including a generally planar, flexible web spaced from the common plane, a shoulder of resilient, elastomeric material along the periphery of the web and projecting from the web toward the common plane, and a layer of low-friction flexible material along the shoulder and providing a sealing surface along the perimeter of the seal in the common plane.

The invention will be more fully understood and still further objects and advantages will become apparent in the following detailed description of embodiments of the invention illustrated in the accompanying drawing wherein:

FIG. 3 is an enlarged fragmentary cross-sectional view taken along line 3–3 of FIG. 2;

FIG. 6 is a fragmentary cross-sectional view taken along line 6–6 of FIG. 5;

Figure 1:
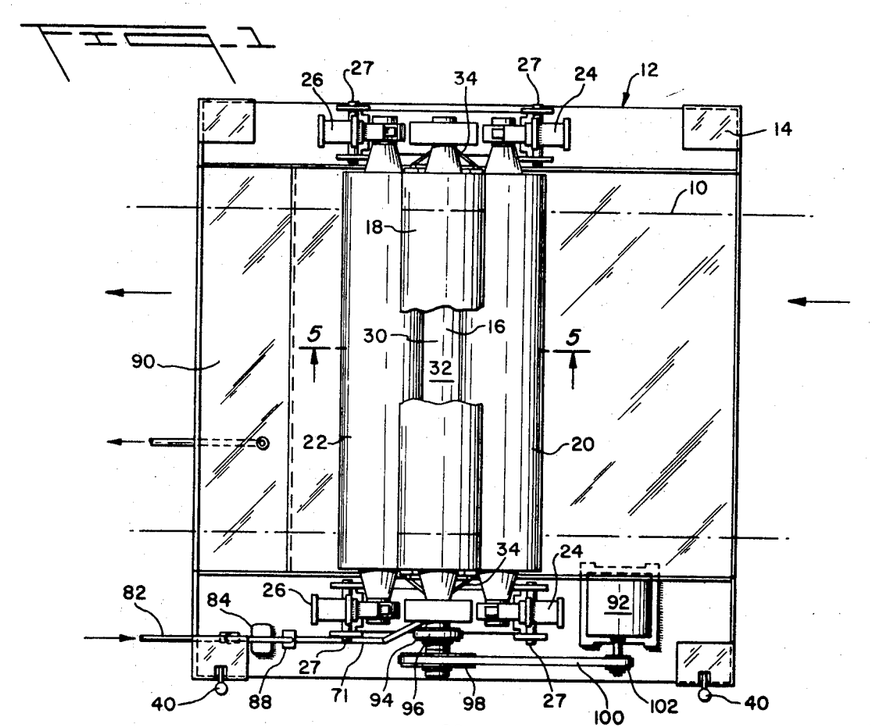
FIG. 1 is a plan view of an apparatus constructed in accordance with the invention.
Figure 2:
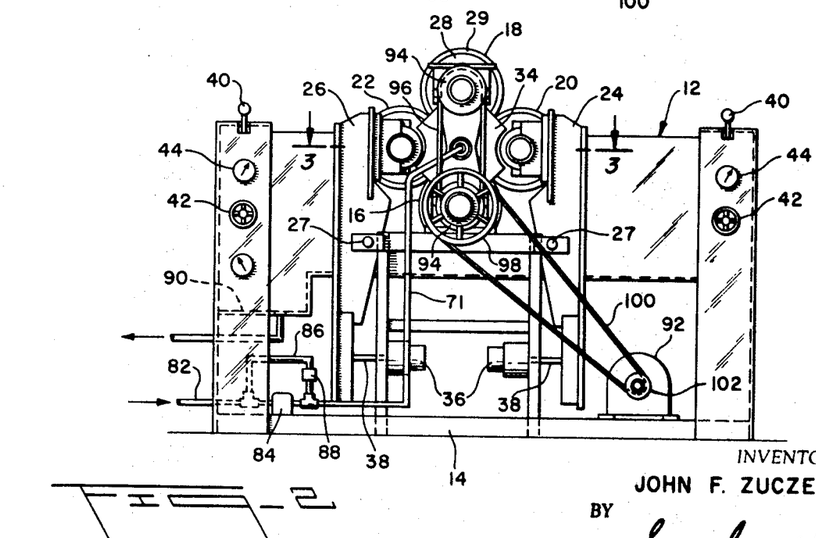
FIG. 2 is an end elevational view of the apparatus of FIG. 1.

Referring to the drawing, and especially to FIGS. 1 and 2, the material to be padded is indicated in phantom at 10 in FIG. 1 and appears in the form of a tubular knit, continuous length, open width absorbent fabric. An apparatus for padding the material 10 is shown generally at 12 and has a frame 14 upon which lower and upper rollers 16 and 18, respectively, are mounted for rotation about generally horizontal axes fixed with respect to the frame. A pair of movable rollers 20 and 22 are each mounted for rotation upon a pair of brackets 24 and 26, respectively. The brackets 24 and 26 are each mounted for pivotal movement with respect to the frame at pivots 27 such that either of the movable rollers 20 or 22 may be moved toward or away from the fixed lower and upper rollers 16 and 18 by pivotal movement of the respective pair of brackets about its pivots. Thus, the movable rollers may be urged against the fixed rollers to establish a cavity 30 within the confines of the four rollers. The rollers are each constructed with a steel arbor 28 and a covering 29 of resilient material such as rubber or a synthetic elastomeric material such as Neoprene which provides each of the rollers with a resilient surface. The axes of rotation of the rollers are parallel and are each generally located at an apex of a parallelogram. When the movable rollers are urged against the fixed rollers, by virtue of the pivotal mounting of the brackets, and cavity 30 is formed within the confines of the four rollers, a chamber 32 may be established by sealing the cavity with dam assemblies 34 which are urged against the corresponding opposite ends of the rollers as will be explained hereinafter. Thus, the walls of the chamber are defined by the four rollers and the two dam assemblies. Each pair of brackets 24 and 26 carrying each movable roller 20 and 22 may be pivoted independent of the other pair of brackets. Pivotal movement of each pair of brackets 24 and 26 is accomplished by selectively variable force exerting means shown in the form of an air cylinder 36 mounted upon the frame 14 and having an actuator rod 38 connected to a bracket. A source of high-pressure air (not shown) is connected to each air cylinder 36 through a lever operated valve 40 and a pressure regulator 42. Prior to actuation of the lever operated valves 40 each pair of brackets is pivoted such that the movable rollers are normally moved away from contact with the fixed rollers and the material to be treated may be threaded through the apparatus. Upon actuation of the lever operated valves 40 high-pressure air is supplied to the air cylinders 36 and the brackets are pivoted to urge the movable rollers against the fixed rollers. By adjustment of the pressure regulators 42, the amount of force exerted by the air cylinders 36 may be selectively varied, thereby varying the force with which each movable roller is urged against the fixed rollers. A pressure gauge 44 is located adjacent each pressure regulator 42 to indicate the magnitude of the pressure of the air supplied to each air cylinder 36 and hence the force with which each movable roller is urged against the fixed rollers.

Turning now to FIG. 3, as well as to FIGS. 1 and 2, the dam assemblies 34 each include an end plate 50 and a seal 52. The end plates 50 are each fixed to a piston 54, one of the pistons 54 being received within a cylinder 56 at one end of the apparatus 12 and the other of the pistons 54 being received within a cylinder 58 at the other end of the apparatus, each of the cylinders 56 and 58 being fixed to the frame 14. The cylinder 56 contains a second piston 60 which is fixed to a tubular rod 62 extending through the end plates 50 and being anchored to the piston 60, the rod 62 being received for sliding movement through the left end plate. High-pressure air is supplied at the inlet 64 to the cylinder 56 forcing the pistons 54 and 60 away from one another such that the left end plate is urged toward the left end of each of the rollers 16, 18, 20 and 22 and the rod 62 draws the right end plate toward the right end of each of the rollers with equal pressure being exerted against the left and right common ends of the rollers at the seals. In this manner the cavity 30 is effectively sealed to establish the chamber 32.

Figure 4:
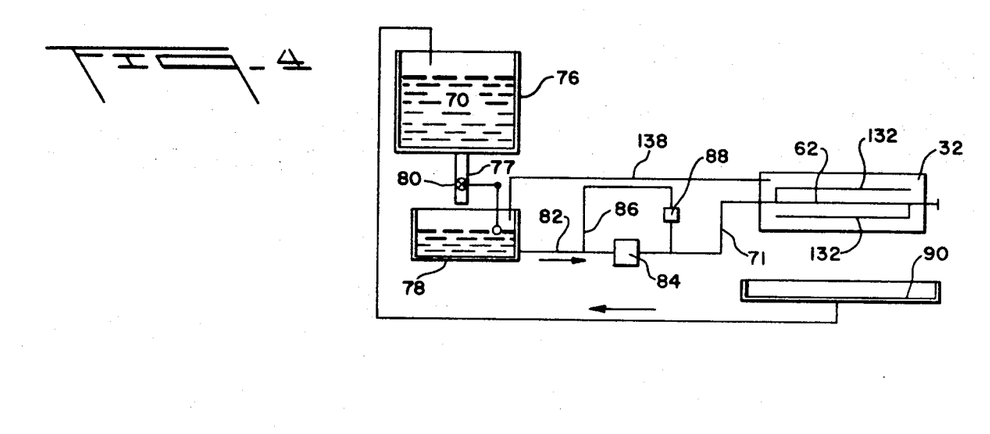
FIG. 4 is a schematic diagram of the system for maintaining a bath of treating liquor under superatmospheric pressure in the apparatus.

During operation of the apparatus, a treating liquor 70 such as, for example, a dye solution is supplied through an inlet pipe 71 to a fitting 72 at one end of the tubular rod 62, the tubular rod being closed at the other end thereof and having a series of apertures 74 therein communicating with the interior of the chamber 32. The treating liquor is maintained within the chamber 32 under a superatmospheric pressure and, as best seen in FIG. 4, the treating liquor 70 is supplied from a reservoir 76 through a feed pipe 77 into a feed tank 78. The level of the liquor in the feed tank 78 is regulated by a float operated valve 80. A supply line 82 carries the liquor to a pump 84 located between the feed tank 78 and the inlet pipe 71. A bypass line 86 contains a pressure regulator 88 so that treating liquor is pumped to the chamber 32 and is maintained at a selected pressure determined by the setting of the pressure regulator 88. Thus, a constant supply of liquor under pressure is provided in the chamber, the liquor being automatically replenished as it is carried away by the material being padded. A trough 90 is provided below the chamber 32 to collect any treating liquor which may escape form the chamber and return such liquor to the reservoir 76.

It has been found that maintaining the pressure of the treating liquor in the chamber at as little as 5 p.s.i. above atmospheric pressure has been found to produce desirable results with a number of materials. Greater pressures may be employed to attain desired results over a wider range of materials and operating conditions.

As best illustrated in FIGS. 1 and 2, driving means are provided in the form of a motor 92 to rotate the rollers 16, 18, 20 and 22 and propel the material 10 through the apparatus 12 in the direction shown. Since each roller is urged against a neighboring roller, only one roller need be driven by the motor 92, the others being driven by contact with their neighbors. However, it has been found more practical to operatively connect driving means to more than one roller so as to reduce the amount of stress placed upon a single directly driven roller which must, in turn, drive a series of rollers. Hence, pulleys 94 connected to the fixed rollers are interconnected for rotation together by a drive belt 96 while a main drive pulley 98 is operatively connected with the motor 92 through a belt 100 and pulley 102.

Figure 5:
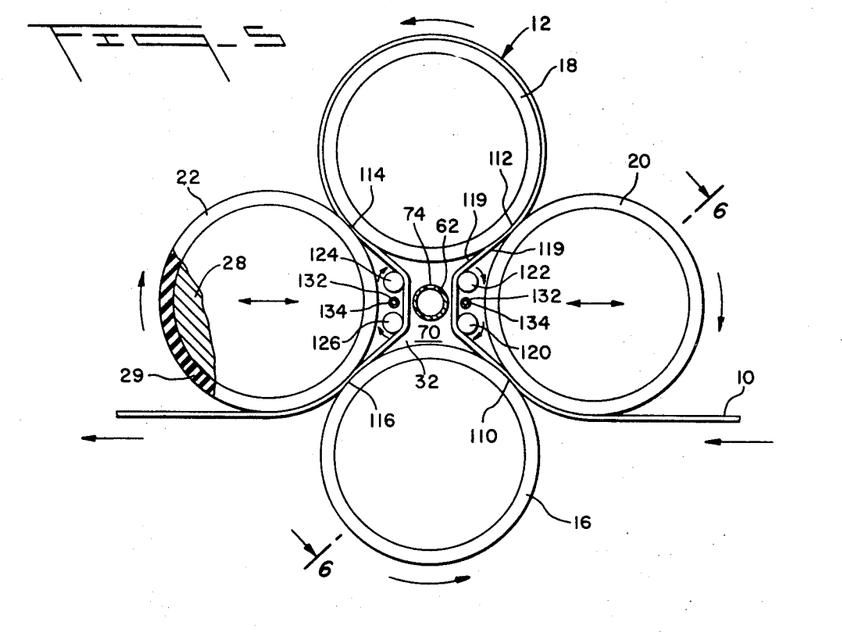
FIG. 5 is an enlarged cross-sectional view taken along line 5–5 of FIG. 1.

Turning now to FIG. 5, the material 10 is threaded through the apparatus 12 so that it first enters a nip 110 between the lower fixed roller 16 and a movable roller 20, then emerges from the nip 110 to be exposed to the pressurized bath of treating liquor 70 in the chamber 32, then leaves the bath through a nip 112 between the movable roller 20 and the upper fixed roller 18, passes around the fixed roller 18 and then reenters the bath through a nip 114 between the upper fixed roller 18 and movable roller 22 for a second exposure to the bath of treating liquor, finally leaving the chamber 32 and the bath therein through a nip 116 between the movable roller 22 and the lower fixed roller 16. Upon entering nip 110, the material is compressed and unwanted matter such as air, water or the like which may be present in the interstices of the material is extracted before the material is exposed to the treating liquor. The material then emerges from the nip 110 and simultaneously passes immediately into the bath of treating liquor which is maintained under superatmospheric pressure in the chamber 32. Once the material is released from nip 110, it will tend to expand and absorb the treating liquor and the increased pressure of the bath not only accelerates the absorption of treating liquor by the material but forcibly drives the liquor into the material to assure thorough penetration of the material by the treating liquor. Upon further travel, the material leaves the chamber 32 through nip 112 and is maintained against the surface of the roller 18 until the material enters nip 114. The material then reenters the chamber 32 through nip 114, the material emerging from nip 114 to be exposed to a second immersion in the bath of treating liquor. Upon further travel, the material passes through nip 116 where excess liquor which has been driven into the material by the combination of the initial extraction and the pressure in the bath is removed from the material and is returned to the bath.

As explained above, rollers 20 and 22 are movable toward and away from fixed rollers 16 and 18 by virtue of the pivotal mounting of the brackets 24 and 26 which enables the axes of these rollers to be moved transversely as indicated by arrows in FIG. 5, thus allowing access to the chamber 32 when the apparatus is not in operation and facilitating threading of the material through the rollers. The movement of each of these rollers as well as the force with which each of the movable rollers 20 and 22 is thrust against the fixed or stationary rollers 16 and 18 is independently adjustable as explained above. By regulating the pressure of the air supplied to each of the air cylinders 36, the force with which the movable rollers 20 and 22 are pressed against the stationary rollers 16 and 18, and hence the pressure at the nips 110 and 116, may be selectively varied and accurately and independently determined. By adjusting the pressure regulator 42 at the right of FIG. 2 the movable roller 20 may be pressed against the fixed roller 16 with a pressure great enough to establish a first predetermined pressure within nip 110 for extracting unwanted matter from the interstices of the material. The other pressure regulator 42 at the left of FIG. 2 may be adjusted independently to urge the roller 22 against the stationary roller 16 with a second predetermined force independent of the first force for establishing a predetermined pressure within nip 116 for removing excess treating liquor from the material. The first predetermined pressure within nip 110 is always greater than the second predetermined pressure at nip 116 and each is selected for optimum operation. Ordinarily, the pressure in nip 110 is chosen to assure that a sufficient amount of unwanted matter is extracted from the material and the pressure within nip 116 is then set according to the amount of liquor which is desired in the finished material. In the dyeing of tubular knit fabrics one critical area is the edge 117 which connects the two layers 118 of the collapsed tubular material as it passes through the apparatus as seen in FIG. 6. A pressure within nip 116 which is too high would produce edges 117 which are lighter in color than the juxtaposed layers 118. A pressure in nip 116 which is too low would produce especially wet edges and concomitant dark lines. Thus, a pressure somewhere between the above conditions must be chosen. In one example, tubular knit cotton was successfully dyed in an apparatus constructed in accordance with the invention employing a pressure of 180 pounds per linear inch of roller length at nip 110 with a pressure of 110 pounds per linear inch of roller length at nip 116, all with a superatmospheric pressure of 5 p.s.i. within the chamber. Under these conditions the padded material exhibited a 90 percent pickup of treating liquor.

Figure 7:
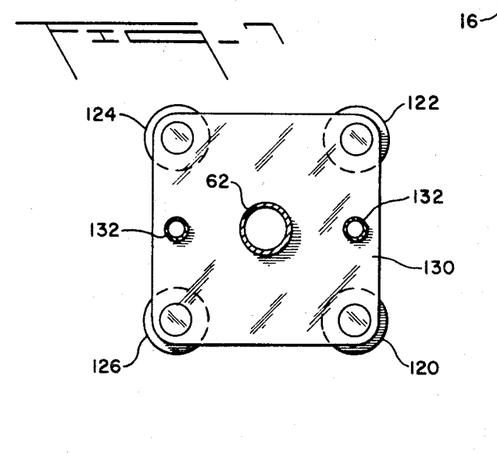
FIG. 7 is an enlarged and elevational view of a guide roller assembly employed in the apparatus.

In the embodiment illustrated in FIG. 5 the material 10 is seen to depart form the surfaces of rollers 16 and 20 after material 10 leaves nip 110 and as the material travels through the bath of treating liquor 70 in the chamber 32. By arranging the path of the material so that the material will thus leave the surfaces of the rollers, both of the opposite faces 119 of the material will be exposed to the treating liquor so that penetration of the material by the liquor will occur from both faces toward the center of the material. In order to accommodate such a path, the apparatus 12 is provided with auxiliary guide means shown in the form of guide rolls 120, 122, 124 and 126 so arranged as to lead the material along a path which is tangent to each pair of cooperating rollers at the nip established by that pair of rollers. In this manner, the opposite faces 119 are both simultaneously exposed to the bath of treating liquor upon leaving nips 110 and 114 and are both simultaneously led into nips 112 and 116 to assure that both faces 119 receive equivalent treatment. Such equivalent treatment is important in that it assures that both faces will receive and pick up equivalent amounts of treating liquor. The necessity for such equivalent amounts is especially critical in dyeing operations where differences in the amounts of dye picked up and retained in the different faces may be detected visually as differences in color or shade. Such "one-sidedness" is undesirable, particularly in tubular knit fabrics, and is avoided in the instant apparatus and method. As best seen in FIGS. 3, 5 and 7, the guide rolls 120, 122, 124 and 126 are mounted for rotation within the chamber 32 by means of supports 130 which are fixed to the tubular rod 62 at each end of the guide rolls and which support each guide roll for free rotation. In order to assure that each opposite face 119 of the material receives an adequate supply of treating liquor at the required superatmospheric pressure, tubular rod 62, which serves as the main feed for distributing treating liquor within the chamber 32, is provided with supplementary legs 132 which are also tubular and which communicate with the interior of tubular rod 62 so as to carry treating liquor from the main feed to be distributed through apertures 134 within the supplementary legs 132 along the full width of the material passing through the chamber. Supplementary legs 132 are also supported by supports 130 through which the supplementary legs pass. The tubular rod 62 and legs 132 extend into the chamber 32 and along essentially the entire width of material 10 between opposite edges 117 to provide means for distributing treating liquor along essentially the entire width of the material and along both opposite faces 119 of the material. While it is desirable to maintain the volume of chamber 32 small, such a small volume could allow exhaustion of the treating liquor in localized areas during continuous operation of the apparatus. This is particularly true where the treating liquor is a dye solution and it is important to maintain the required concentration of dye throughout the solution. Thus, the length of tubular rod 62 and legs 132 and the placement of the legs inside the envelopes formed by the material and rollers 20 and 22, as well as the placement of rod 62 outside those envelopes, assures that the treating liquor will be replenished along the entire width of both exposed faces of the material.

Figure 8:
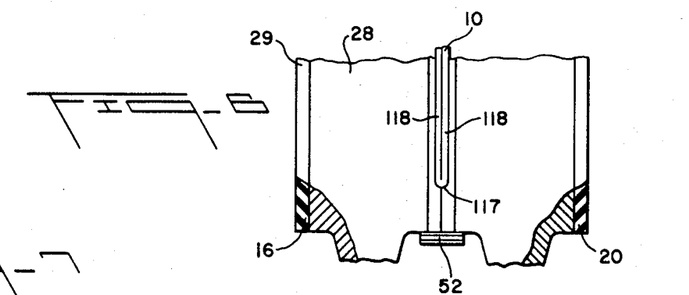
FIG. 8 is an enlarged cross-sectional view taken at a location similar to FIG. 5 but illustrating an alternative form.

In those processes where it is not necessary to expose both opposite faces of the material to the treating liquor within the chamber, the guide rolls and supplementary legs are not required, and, as best seen in FIG. 8, the material may follow a path along the surfaces of the cooperating rollers from the time the material enters the apparatus at nip 110 until the material leaves the apparatus at nip 116. Such a path is particularly advantageous where the material is subject to elongation during immersion in the bath and where no supplementary precautions are taken to compensate for such elongation. Elongation is precluded in the embodiment of FIG. 8 by virtue of the tendency of the material to cling to the surfaces of the rollers with the consequent prevention of elongation.

Figure 9:
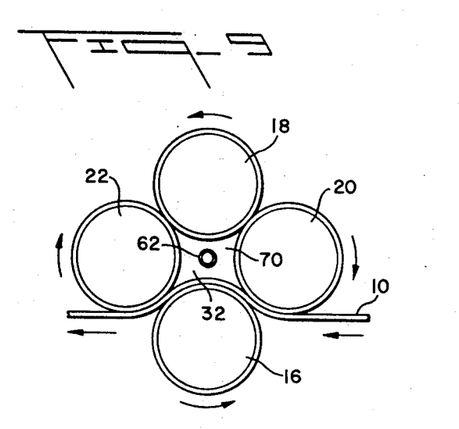
FIG. 9 is similar to FIG. 8 but shows another alternative.

Although the embodiments of FIGS. 5 and 8 show the material passing through the chamber twice, it is also feasible to pass material through the apparatus only once as illustrated in FIG. 9. In the embodiment of FIG. 9, the material passes into the chamber 32 through the nip 110 and then passes out of the chamber through the nip 116 after only one immersion in the bath of treating liquor 70. Such an embodiment is feasible where the shorter immersion is adequate for the particular material and treating liquor employed. The basic steps of extracting unwanted matter, immersing in a bath of treating liquor held at superatmospheric pressure and removing excess liquor are still accomplished at nip 110, within chamber 32, and at nip 116, respectively.

Figure 10:
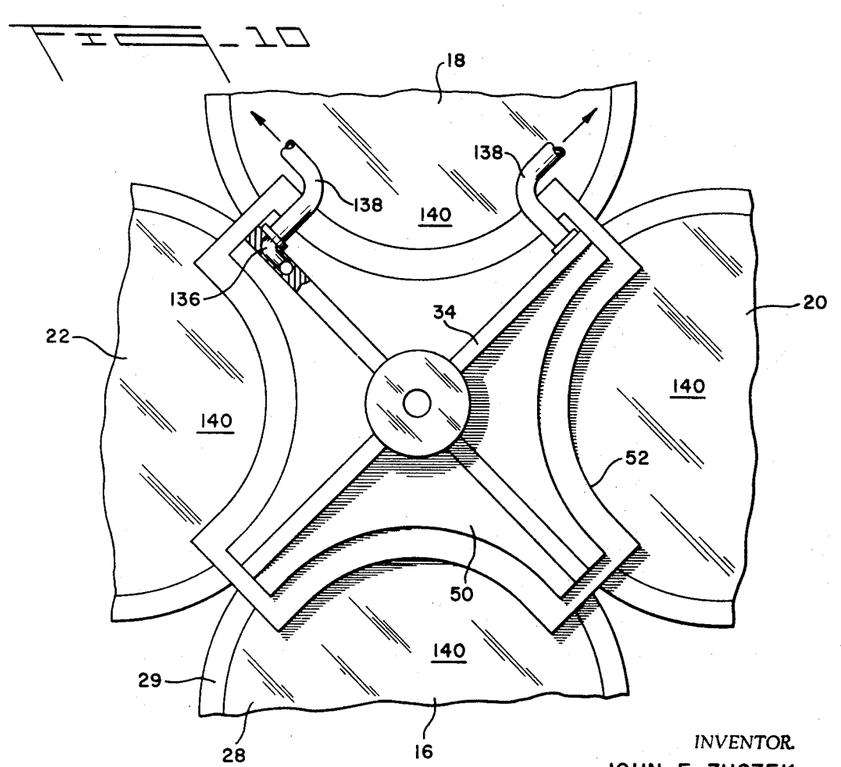
FIG. 10 is a fragmentary end elevational view illustrating the construction at the end of the chamber provided in the apparatus.
Figure 11:
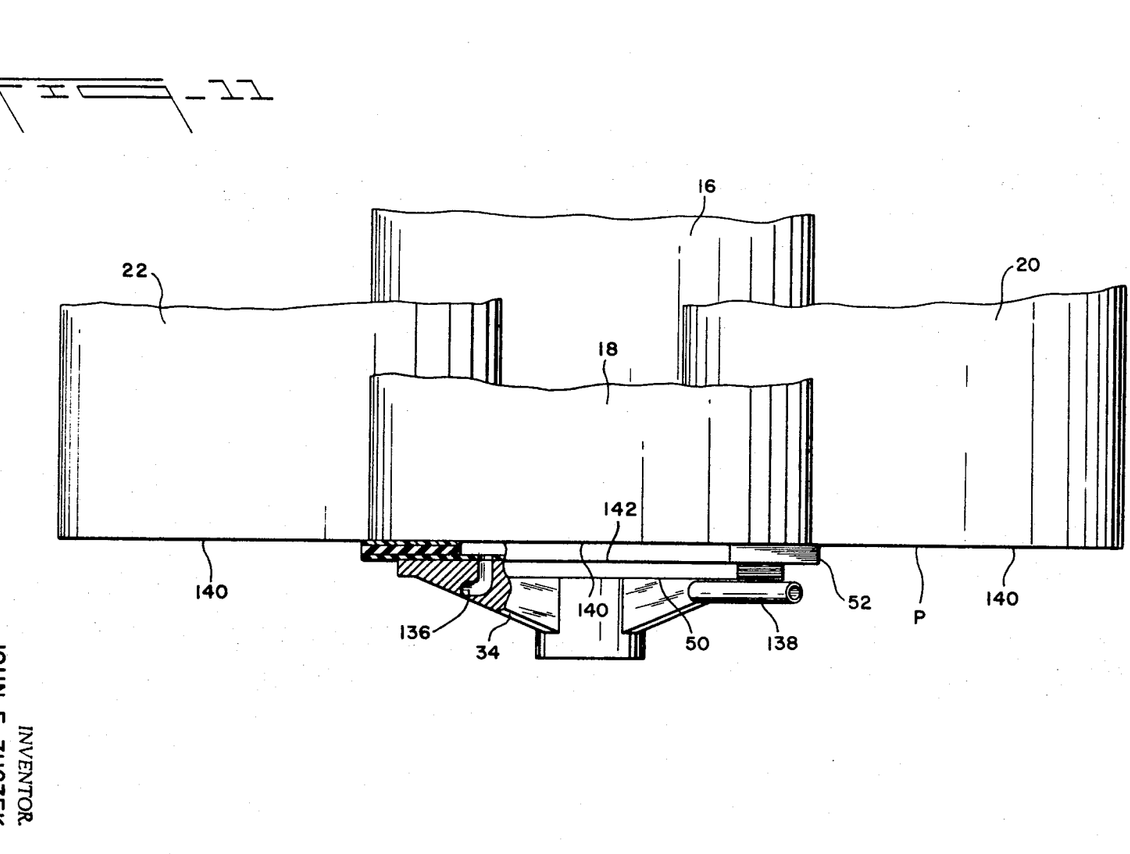
FIG. 11 is a fragmentary plan view of the detail of construction of FIG. 10.

It has been found that during the operation of apparatus 12, there is a tendency for air to accumulate within the chamber 32. This air is apparently continually brought into the chamber by the material as it enters the chamber since it is not feasible, from a practical standpoint, to squeeze all of the air from the interstices of the material as the material passes through a nip into the chamber. Any volume of air which accumulates within the chamber will tend to reduce the amount of dye liquor available for the immersion of the material and will interfere with penetration of the material by the treating liquor and thus adversely affect the effective operation of the apparatus. Such accumulated air could form a pocket adjacent nip 114 and defeat the immediate immersion of the material as the material leaves that nip. In addition, air can form foam within the chamber, and foam will not effectively penetrate the material. The air will tend to rise to the uppermost portions of the chamber; hence, means are provided in the form of passages 136 extending through the end plates 50 adjacent the vertically uppermost regions of the chamber 32. As best seen in FIGS. 10 and 11, the passages 136 communicate with the interior of the chamber 32 at these uppermost regions which lie adjacent nips 112 and 114. The passages 136 are connected to external tubes 138 which remove and carry away the unwanted air to assure that the chamber 32 is filled with treating liquor. As seen in FIG. 4, tubes 138 are led back to the feed tank 78. Thus, the pressure available within the chamber will drive air, as well as foam and some liquor, through tubes 138, but the liquor will be recovered in the system by the return of tubes 138 to tank 78.

Figure 12:
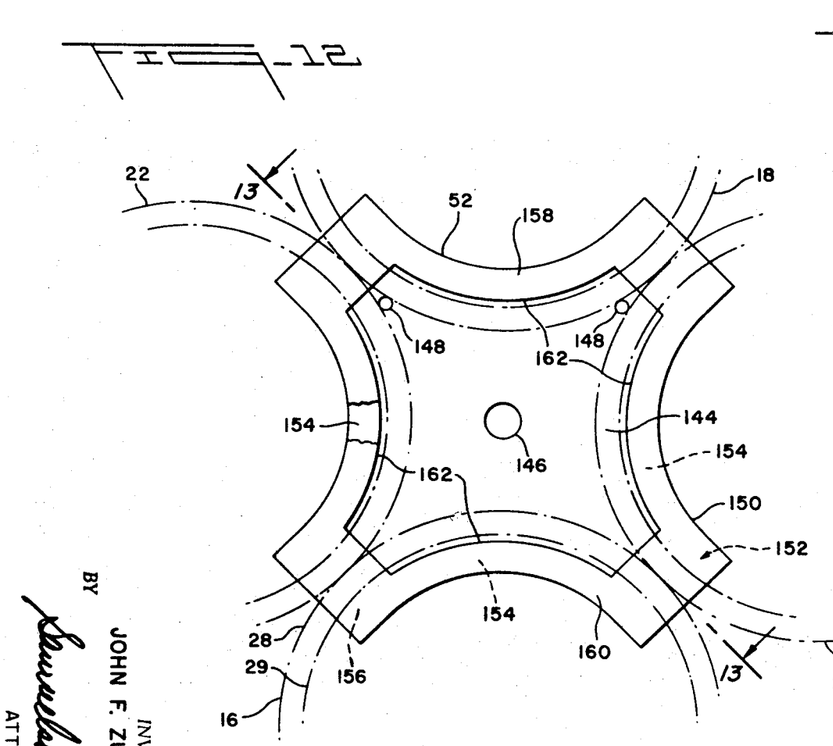
FIG. 12 is a partially diagrammatic elevational view of a seal employed in the apparatus.
Figure 13:
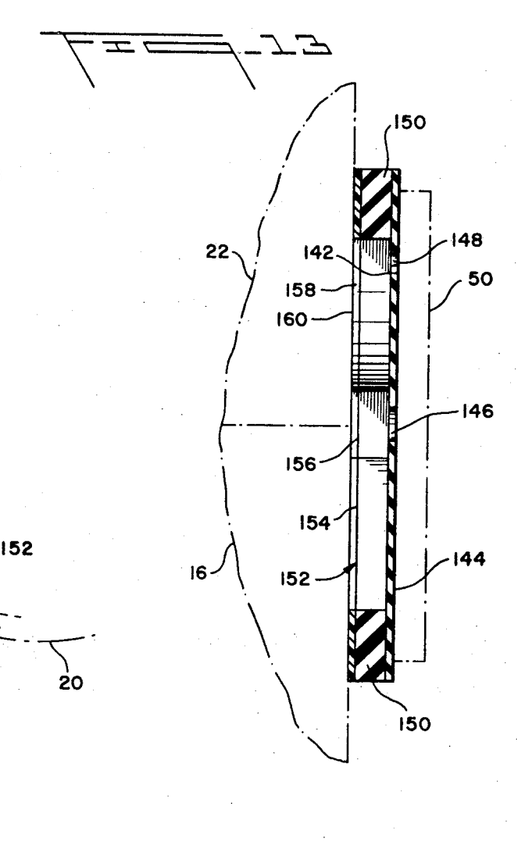
FIG. 13 is a cross-sectional view taken along line 13–13 of FIG. 12.

It is important that apparatus 12 be provided with sealing means at the ends of the rollers 16, 18, 20 and 22 which means will adequately seal the cavity 30 established between the cooperating rollers to complete the chamber 32. Turning now to FIGS. 10 and 11, it will be seen that all of the corresponding ends of the rollers have flat face portions 140 which lie in a common plane P generally perpendicular to the horizontally oriented central axes of the rollers. As described above, a dam assembly 34 is urged against each of the opposite ends of all of the rollers to seal the ends of the cavity 30 and establish the chamber 32. Each dam assembly 34 includes an end plate 50 and a seal 52. The end plate 50 is a relatively rigid member, preferably fabricated of steel or some similar rigid, high strength material, and has a planar face 142 which lies contiguous with the seal 52. The seal 52, which is best shown in FIGS. 12 and 13, includes a relatively thin, flexible web 144 which is generally planar and which lies against the corresponding planar face 142 of an end plate 50. The web 144 is provided with a central aperture 146 through which the tubular rod 62 may pass and apertures 148 adjacent the uppermost portions thereof for communication with the air removal passages 136 in the end plates. A resilient backing member is shown in the form of a shoulder 150 projecting from the web 144 toward the common plane and the common ends of the rollers, the shoulder 150 extending along the periphery of the web and providing a flat surface 152 which has an arcuate portion 154 for each end face portion 140 of each roller and interconnecting portions 156 connecting the arcuate portions 154 at the extremities thereof. A layer 158 of material having a relatively low coefficient of friction covers the flat surface 152 of the shoulder 150 and extends along the entire flat surface. The layer 158 is flexible so as to establish a bearing member providing a sealing surface 160 extending along the corresponding end face portions 140 of the rollers. The shoulder 150 is fabricated of a resilient elastomeric material so that the flexible bearing member provided by the layer 158 is continually urged against the corresponding end face portions of the rollers with a sufficient force to seal the interface between the sealing surface and the roller ends against forces which would otherwise allow the escape of the treating liquor held under superatmospheric pressure within the chamber. The preferable material for layer 158 is a synthetic resin chosen from among those plastic materials having flexibility and low-friction characteristics such as, for example, nylon or a fluoroplastic such as Teflon, the preferred material being a fluoroplastic in view of the exceptionally low coefficient of friction exhibited by such materials and their very low permeability to moisture and vapor with practically no moisture absorption.

Referring now to FIG. 12, it is noted that the maximum radius of the arc followed by the shoulder 150 and the layer 158 of synthetic resin thereon is somewhat less than the overall radius of the end face portions 140 of the rollers, as illustrated by the phantom outline of the outer peripheries of the ends of the rollers 16, 18, 20 and 22. Thus, portions of the shoulder 150 and the layer 158 terminate at a radial distance from the central axis of the rollers which is less than the radius of the rollers. Since the end face portions 140 of the rollers are displaced from the web 144 by the thickness of the backing member provided by the shoulder 150 and since the outer peripheries of these end face portions extend inwardly beyond the inner peripheries 162 of the arcuate bearing member portions 154 provided by the layer 158 of synthetic resin material between interconnecting portions 156, at least a part of the end face portion of each roller between the extremities of the seal will be exposed to the treating liquor. Such exposure enables the treating liquor within the chamber to serve as a heat exchange medium which will carry away heat generated by the friction between the roller end face portions and the sealing surface from those parts of the end face portions which are so exposed. In addition, the wetting of the exposed part of the end face portions of each roller will serve to lubricate the seal at the extremities thereof. Thus, the seal construction employed in combination with apparatus 12 becomes self-cooling and self-lubricating for effective operation over relatively long periods of time. It is noted that the exposed parts of end face portions 140 include a part of the end of the steel arbor 28 as well as the end of the resilient covering 29 so that some cooling of the arbor 28 is attained while immersion of the entire thickness of the covering 29 assures adequate cooling of the covering.

It is to be understood that the above-detailed description of embodiments of the invention are provided by way of example only. Details of design and construction may be modified without departing from the true spirit and scope of the invention as set forth in the appended claims.

I claim:

1. A seal for closing the given area which lies between corresponding ends of cooperating rollers, said ends ordinarily lying in a common plane containing said given area, said seal comprising:
   a generally planar, flexible web spaced from the common plane, said web having an overall perimeter defining an area greater than and similar in shape to said given area;
   a shoulder of resilient elastomeric material along the periphery of the web and projecting from the web toward the common plane, said shoulder having an inner periphery defining an area greater than said given area but less than the area defined by the overall perimeter of the web; and
   a layer of low-friction flexible material along the shoulder and providing a sealing surface in the common plane along the perimeter of the seal.

2. The seal of claim 1 wherein at least portions of the inner periphery of the shoulder and corresponding portions of the layer follow an arc having a maximum radius less than the overall radius of the corresponding portions of the ends of the cooperating rollers.

3. The seal as defined in claims 1, or 2 wherein the low-friction flexible material is a synthetic resin.

4. The seal as defined in claims 1, or 3 wherein the low-friction flexible material is a fluoroplastic.